US012559386B2

(12) United States Patent
Lee et al.

(10) Patent No.: US 12,559,386 B2
(45) Date of Patent: Feb. 24, 2026

(54) METHOD OF PREPARING POSITIVE ELECTRODE ACTIVE MATERIAL

(71) Applicant: LG Chem, Ltd., Seoul (KR)

(72) Inventors: Woo Ram Lee, Daejeon (KR); Na Ri Kim, Daejeon (KR); Dong Ryoung Kang, Daejeon (KR); Sang Soon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 523 days.

(21) Appl. No.: 18/005,906

(22) PCT Filed: Aug. 18, 2021

(86) PCT No.: PCT/KR2021/010946
§ 371 (c)(1),
(2) Date: Jan. 18, 2023

(87) PCT Pub. No.: WO2022/039491
PCT Pub. Date: Feb. 24, 2022

(65) Prior Publication Data
US 2023/0322581 A1     Oct. 12, 2023

(30) Foreign Application Priority Data
Aug. 18, 2020     (KR) ........................ 10-2020-0103341

(51) Int. Cl.
| | |
|---|---|
| *C01G 53/50* | (2025.01) |
| *C01G 53/04* | (2025.01) |
| *C01G 53/82* | (2025.01) |
| *H01M 4/04* | (2006.01) |
| *H01M 4/1391* | (2010.01) |
| *H01M 4/525* | (2010.01) |

(52) U.S. Cl.
CPC ............. *C01G 53/50* (2013.01); *C01G 53/04* (2013.01); *C01G 53/82* (2025.01); *H01M 4/0471* (2013.01); *H01M 4/1391* (2013.01); *H01M 4/525* (2013.01)

(58) Field of Classification Search
CPC .. H01M 4/0471; H01M 4/1391; H01M 4/525; H01M 2004/028; C01G 53/04; C01G 53/50; C01G 53/82; C01P 2002/32
See application file for complete search history.

(56) References Cited

U.S. PATENT DOCUMENTS

| | | | |
|---|---|---|---|
| 2005/0170250 A1 | 8/2005 | Ohzuku et al. | |
| 2011/0076564 A1 | 3/2011 | Yu et al. | |
| 2011/0287319 A1 | 11/2011 | Vogler et al. | |
| 2014/0332715 A1 | 11/2014 | Kawakami et al. | |
| 2015/0014605 A1* | 1/2015 | Kawakami | H01M 4/362 |
| | | | 252/519.1 |
| 2015/0380736 A1 | 12/2015 | Park et al. | |
| 2016/0068991 A1 | 3/2016 | Vogler et al. | |
| 2017/0179485 A1 | 6/2017 | Vogler et al. | |
| 2017/0358798 A1 | 12/2017 | Kageura et al. | |
| 2018/0248179 A1 | 8/2018 | Wang et al. | |
| 2018/0351175 A1 | 12/2018 | Kawasaki et al. | |
| 2019/0006668 A1 | 1/2019 | Von Bülow et al. | |
| 2019/0296349 A1 | 9/2019 | Cho et al. | |
| 2020/0243858 A1 | 7/2020 | Von Bülow et al. | |
| 2020/0350554 A1* | 11/2020 | Choi | C01G 53/54 |
| 2021/0028445 A1 | 1/2021 | Jung et al. | |
| 2021/0265615 A1 | 8/2021 | Choi et al. | |
| 2022/0098054 A1 | 3/2022 | Lee et al. | |
| 2022/0181621 A1 | 6/2022 | Kawasaki et al. | |

FOREIGN PATENT DOCUMENTS

| | | |
|---|---|---|
| CN | 100499222 C | 6/2009 |
| CN | 107565122 A | 1/2018 |
| CN | 107910534 A | 4/2018 |
| CN | 108346797 A | 7/2018 |
| CN | 110137488 A | 8/2019 |
| CN | 110461770 A | 11/2019 |
| EP | 3336939 A1 | 6/2018 |
| EP | 3341991 B1 | 7/2020 |
| JP | 2014237579 A | 12/2014 |
| JP | 5791877 B2 | 10/2015 |
| JP | 2018206554 A | 12/2018 |
| JP | 2020071899 A | 5/2020 |
| JP | 2020087638 A | 6/2020 |
| JP | 2020123493 A | 8/2020 |
| JP | 2021536098 A | 12/2021 |
| JP | 2022517078 A | 3/2022 |
| KR | 100842142 B1 | 6/2008 |
| KR | 20110036897 A | 4/2011 |
| KR | 20130112583 A | 10/2013 |
| KR | 20160002200 A | 1/2016 |
| KR | 20170095888 A | 8/2017 |
| KR | 20190048923 A | 5/2019 |
| KR | 20190119442 A | 10/2019 |
| WO | WO 2019-103522 * | 5/2019 |
| WO | 2020055198 A1 | 3/2020 |
| WO | 2020153701 A1 | 7/2020 |

OTHER PUBLICATIONS

Extended European Search Report including Written Opinion for Application No. 21858578.4 dated Jan. 23, 2024, pp. 1-7.
Zhu, Z. et al., "Preparation of spherical hierarchical LiNi0.5Mnl.5O4 with high electrochemical performances by a novel composite co-precipitation method for 5 V lithium ion secondary batteries", Electrochimica Acta, vol. 115, Nov. 2, 2013 (Nov. 2, 2013), pp. 290-296, Elsevier, Amsterdam, NL, XP028809835.
International Search Report for Application No. PCT/KR2021/010946 mailed Dec. 10, 2021, pp. 1-3.

(Continued)

*Primary Examiner* — Brittany L Raymond
(74) *Attorney, Agent, or Firm* — Lerner David LLP

(57) ABSTRACT

A method of preparing a positive electrode active material includes forming a pre-sintered product by mixing a transition metal precursor having a nickel content of 70 atm % or more and a lithium raw material and performing primary sintering, and forming a lithium composite transition metal oxide by performing secondary sintering on the pre-sintered product, wherein the primary sintering is performed such that a ratio of a spinel phase of the pre-sintered product is in a range of 7% to 16%.

9 Claims, No Drawings

(56)  References Cited

OTHER PUBLICATIONS

Search Report dated Sep. 19, 2024 from the Office Action for Chinese Application No. 202180061111.1 Issued Sep. 25, 2024, pp. 1-3.

* cited by examiner

METHOD OF PREPARING POSITIVE ELECTRODE ACTIVE MATERIAL

This application is a national phase entry under 35 U.S.C. § 371 of International Application No. PCT/KR2021/010946, filed on Aug. 18, 2021, which claims priority from Korean Patent Application No. 10-2020-0103341, filed on Aug. 18, 2020, the disclosures of which are incorporated by reference herein.

TECHNICAL FIELD

The present invention relates to a method of preparing a positive electrode active material, and more particularly, to a method of preparing a nickel-rich positive electrode active material having excellent capacity retention and resistance characteristics.

BACKGROUND ART

Demand for secondary batteries as an energy source has been significantly increased as technology development and demand with respect to mobile devices and electric vehicles have recently increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium transition metal oxide, in which a portion of nickel (Ni) is substituted with cobalt (Co), manganese (Mn), or aluminum (Al), has been developed.

With respect to a lithium ion battery using the lithium transition metal oxide, particularly, a Ni-rich lithium transition metal oxide, as a positive electrode active material, since an amount of oxidation of nickel is increased in the same voltage range due to a high nickel content, an amount of lithium ion movement is increased, and, as a result, there is a limitation in that stability of a positive electrode is reduced and life characteristics of the secondary battery are degraded.

Thus, there is a need to develop a Ni-rich positive electrode active material having excellent life characteristics.

DISCLOSURE OF THE INVENTION

Technical Problem

An aspect of the present invention provides a method of preparing a nickel-rich positive electrode active material which may improve life characteristics by controlling sintering conditions during the preparation of the Ni-rich positive electrode active material.

Technical Solution

According to an aspect of the present invention, there is provided a method of preparing a positive electrode active material which includes the steps of: forming a pre-sintered product by mixing a transition metal precursor having a nickel content of 70 atm % or more and a lithium raw material and performing primary sintering; and forming a lithium composite transition metal oxide by performing secondary sintering on the pre-sintered product, wherein the primary sintering is performed such that a ratio of a spinel phase of the pre-sintered product is in a range of 7% to 16%.

If necessary, the method may further include a step of measuring crystalline phase information of the pre-sintered product and/or a step of grinding or classifying the pre-sintered product after the forming of the pre-sintered product.

The transition metal precursor and the lithium raw material may be mixed in amounts such that a molar ratio of lithium:transition metal is in a range of 1.04:1 to 1.1:1.

Preferably, the transition metal precursor may be a compound represented by the following Formula 1 or Formula 2, and the lithium raw material may be $LiOH \cdot H_2O$.

$$Ni_aCo_bMn_c(OH)_2 \qquad \text{[Formula 1]}$$

$$Ni_aCo_bMn_cOOH \qquad \text{[Formula 2]}$$

In Formula 1 and Formula 2, $0.7 \le a < 1$, $0.01 \le b < 0.3$, and $0.01 \le c < 0.3$.

The primary sintering may be performed in a temperature range of 580° C. to 680° C., and the secondary sintering may be performed in a temperature range of 700° C. to 850° C.

A $M^1$ raw material (where $M^1$ is at least one selected from the group consisting of aluminum (Al), silicon (Si), boron (B), tungsten (W), molybdenum (Mo), magnesium (Mg), vanadium (V), titanium (Ti), zinc (Zn), gallium (Ga), indium (In), ruthenium (Ru), niobium (Nb), tantalum (Ta), tin (Sn), strontium (Sr), lanthanum (La), cerium (Ce), praseodymium (Pr), and zirconium (Zr)) may be further mixed prior to the primary sintering, and, in this case, the $M^1$ raw material may be aluminum hydroxide.

The lithium composite transition metal oxide prepared according to the preparation method of the present invention may be a compound represented by the following Formula 3.

$$Li_{1+x}[Ni_aCo_bMn_cM^1_d]O_2 \qquad \text{[Formula 3]}$$

In Formula 3, $0 \le x \le 0.1$, $0.7 \le a < 1$, $0.01 \le b < 0.3$, $0.01 \le c < 0.3$, $0 \le d < 0.3$, and $a+b+c+d=1$, and $M^1$ is at least one selected from the group consisting of Al, Si, B, W, Mo, Mg, V, Ti, Zn, Ga, In, Ru, Nb, Ta, Sn, Sr, La, Ce, Pr, and Zr.

Advantageous Effects

Since a method of preparing a positive electrode active material according to the present invention allows a content of a spinel phase of a pre-sintered product to be within a specific range by adjusting primary sintering conditions, the method improves reactivity of lithium and a transition metal precursor and crystallinity of a final product, and thus, the method allows to prepare a nickel-rich positive electrode active material having excellent life characteristics.

Also, according to the method of preparing a positive electrode active material of the present invention, since secondary sintering is performed after moisture and unnecessary gases are removed during primary sintering, density of the positive electrode active material is increased and an effect of improving the crystallinity may be obtained.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

As a result of a significant amount of research conducted to improve initial capacity and life characteristics of a nickel (Ni)-rich positive electrode active material, the present inventors have found that, in case in which secondary sintering is performed after a pre-sintered product is formed through primary sintering during preparation of the Ni-rich positive electrode active material, but the primary sintering is performed such that a ratio of a spinel phase among crystalline phases of the pre-sintered product satisfies a specific range, the initial capacity and life characteristics of the Ni-rich positive electrode active material may be improved, thereby leading to the completion of the present invention.

Hereinafter, the present invention will be described in more detail.

A method of preparing a positive electrode active material according to the present invention includes the steps of: (1) forming a pre-sintered product by mixing a transition metal precursor having a nickel content of 70 atm % or more and a lithium raw material and performing primary sintering; and (2) forming a lithium composite transition metal oxide by performing secondary sintering on the pre-sintered product, and, in this case, the primary sintering is performed such that a ratio of a spinel phase of the pre-sintered product is in a range of 7% to 16%. After the forming of the pre-sintered product, if necessary, the method may further include a step of measuring crystalline phase information of the pre-sintered product and/or a step of grinding or classifying the pre-sintered product.

Hereinafter, each step of the method of preparing a positive electrode active material according to the present invention will be described in detail.

Step (1): Primary Sintering Step

First, a transition metal precursor and a lithium raw material are mixed and primary sintering is performed to form a pre-sintered product.

In this case, the transition metal precursor may be a hydroxide or oxyhydroxide containing nickel, manganese, and cobalt, wherein an amount of nickel among total transition metals may be 70 atm % or more, preferably 80 atm % to 99 atm %, and more preferably 80 atm % to 95 atm %.

4

Specifically, the transition metal precursor may be a compound represented by the following Formula 1 or Formula 2.

$$Ni_aCo_bMn_c(OH)_2 \hspace{2cm} \text{[Formula 1]}$$

$$Ni_aCo_bMn_cOOH \hspace{2cm} \text{[Formula 2]}$$

In Formula 1 and Formula 2, $0.7 \leq a < 1$, $0.01 \leq b < 0.3$, and $0.01 \leq c < 0.3$.

a represents an atomic ratio of nickel among total transition metals in the transition metal precursor, wherein a may satisfy $0.7 \leq a < 1$, preferably $0.8 \leq a \leq 0.99$, and more preferably $0.8 \leq a \leq 0.95$.

b represents an atomic ratio of cobalt among the total transition metals in the transition metal precursor, wherein b may satisfy $0.01 \leq b < 0.3$, preferably $0.01 \leq b < 0.2$, and more preferably $0.01 \leq b \leq 0.15$.

c represents an atomic ratio of manganese among the total transition metals in the transition metal precursor, wherein c may satisfy $0.01 \leq c < 0.3$, preferably $0.01 \leq c < 0.2$, and more preferably $0.01 \leq c \leq 0.15$.

As the lithium raw material, for example, lithium-containing carbonates (e.g., lithium carbonate), hydrates (e.g., lithium hydroxide hydrate ($LiOH \cdot H_2O$), etc.), hydroxides (e.g., lithium hydroxide, etc.), nitrates (e.g., lithium nitrate ($LiNO_3$), etc.), or chlorides (e.g., lithium chloride ($LiCl$), etc.) may be used, but, among them, the lithium raw material may particularly be $LiOH \cdot H_2O$.

It is desirable that the transition metal precursor and the lithium raw material may be mixed in amounts such that a molar ratio of lithium:transition metal is in a range of 1.04:1 to 1.1:1, preferably 1.05:1 to 1.1:1, and more preferably 1.06:1 to 1.1:1. In a case in which the molar ratio of lithium:transition metal is less than 1.04:1, since a degree of cation mixing becomes severe and hexagonal ordering of a lattice structure is broken, electrochemical performance of the positive electrode active material may be degraded. In a case in which the molar ratio of lithium:transition metal is greater than 1.1:1, since an excessive amount of lithium may not be inserted into the lattice structure of the positive electrode active material and remains on a surface to act as an impurity, gelation occurs during preparation of a positive electrode slurry to not only make it difficult to form a uniform slurry but also increase an amount of gas generated during battery operation, and thus, stability and long-term life capability may be reduced.

In the present invention, the primary sintering is performed such that a ratio of a spinel phase in the pre-sintered product is in a range of 7% to 16%, for example, 8% to 15%. According to the study of the present inventors, in a case in which the ratio of the spinel phase of the pre-sintered product satisfies the above range, an excellent effect of improving life characteristics may be obtained, and, particularly, an effect of improving resistance characteristics is significantly exhibited.

The ratio of the spinel phase of the pre-sintered product varies according to complex factors such as sintering temperature, sintering time, types of raw materials used, and a mixing ratio of the raw materials. Thus, in order to control the ratio of the spinel phase of the pre-sintered product within the above range, there is a need to appropriately adjust the sintering temperature or sintering time in consideration of the types and mixing ratio of the raw materials used.

Specifically, in the present invention, the primary sintering may be performed in a temperature range of 580° C. to 680° C., for example, 600° C. to 650° C. for 1 hour to 15 hours, for example, 3 hours to 10 hours. When the primary sintering temperature and sintering time satisfy the above ranges, the ratio of the spinel phase is formed in the desired range.

Also, the primary sintering may be performed in an air atmosphere or an oxygen atmosphere. In a case in which the primary sintering is performed in an air atmosphere or an oxygen atmosphere, there is an effect that an oxidation reaction of the precursor is promoted in comparison to a case where sintering is performed in an inert atmosphere.

Although not essential, in addition to the transition metal precursor and the lithium raw material, an $M^1$ raw material containing at least one element ($M^1$ element) selected from the group consisting of aluminum (Al), silicon (Si), boron (B), tungsten (W), molybdenum (Mo), magnesium (Mg), vanadium (V), titanium (Ti), zinc (Zn), gallium (Ga), indium (In), ruthenium (Ru), niobium (Nb), tantalum (Ta), tin (Sn), strontium (Sr), lanthanum (La), cerium (Ce), praseodymium (Pr), and zirconium (Zr) may be further mixed prior to the primary sintering. In a case in which the $M^1$ raw material is further mixed prior to the primary sintering, a positive electrode active material doped with the $M^1$ element contained in the $M^1$ raw material may be prepared. The $M^1$ raw material, for example, may be an acetic acid salt, nitrate, sulfate, halide, sulfide, hydroxide, oxide, or oxyhydroxide containing the $M^1$ element, that is, at least one metallic element selected from the group consisting of Al, Si, B, W, Mo, Mg, V, Ti, Zn, Ga, In, Ru, Nb, Ta, Sn, Sr, La, Ce, Pr, and Zr. In a case in which $M^1$ is Al, the $M^1$ raw material may be aluminum hydroxide.

After forming the pre-sintered product through the above-described process, if necessary, a step of measuring crystalline phase information of the pre-sintered product may be additionally performed.

The step of measuring the crystalline phase information of the pre-sintered product, for example, may be performed in such a manner that, after a sample of the pre-sintered product is collected, a ratio of a spinel phase among crystalline phases is measured by performing X-ray diffraction (XRD) analysis. That is, the ratio of the spinel phase may be calculated by measuring intensity contribution of each phase using XRD data measured for the pre-sintered product together with a cubic phase ($NiO/LiN_2O_4$) and a layered phase ($LiNiO_2$) through Rietveld refinement.

After measuring the crystalline phase information of the pre-sintered product as described above, a positive electrode active material having excellent initial capacity and life characteristics may be prepared by performing secondary sintering when the ratio of the spinel phase of the pre-sintered product is in a range of 7% to 16%.

Also, the preparation method of the present invention may further include a step of grinding and/or classifying the pre-sintered product after the primary sintering, if necessary. In a case in which the step of grinding and/or classifying the pre-sintered product is additionally performed, since moisture and gas generated during the primary sintering may be removed during a grinding and/or classification process and mixing of the pre-sintered product is more effectively performed, sintering uniformity is improved during the secondary sintering and an effect of improving quality uniformity of the finally-prepared positive electrode active material may be obtained.

Step (2): Secondary Sintering Step

Next, secondary sintering is performed on the pre-sintered product to form a lithium composite transition metal oxide.

The secondary sintering is to change the spinel phase of the pre-sintered product into a layered phase, wherein the secondary sintering may be performed at a temperature that is 100° C. to 200° C. higher than the primary sintering temperature, for example, at a temperature that is 100° C. to 180° C. higher than the primary sintering temperature.

In a case in which a difference between the secondary sintering temperature and the primary sintering temperature is less than 100° C., conversion of the spinel phase into the layered phase is not smoothly performed, and, in a case in which the difference between the secondary sintering temperature and the primary sintering temperature is greater than 200° C., since positive electrode active material particles are severely agglomerated, dispersion is difficult during the preparation of the positive electrode slurry and it is difficult to apply the positive electrode slurry to a uniform thickness, and thus, processability may be reduced.

Specifically, the secondary sintering may be performed in a temperature range of 700° C. to 850° C., preferably 700° C. to 800° C., and more preferably 720° C. to 800° C.

The secondary sintering may be performed for 1 hour to 15 hours, for example, 3 hours to 10 hours.

Also, the secondary sintering may be performed in an air atmosphere or an oxygen atmosphere. In a case in which the secondary sintering is performed in an air atmosphere or an oxygen atmosphere, there is an effect that the oxidation reaction of the precursor, crystal growth, and phase change are promoted in comparison to a case where sintering is performed in an inert atmosphere.

The lithium composite transition metal oxide prepared according to the preparation method of the present invention may be a compound represented by the following Formula 3.

$$Li_{1+x}[Ni_aCo_bMn_cM^1_d]O_2 \qquad \text{[Formula 3]}$$

In Formula 3, $M^1$ is at least one element selected from the group consisting of Al, Si, B, W, Mo, Mg, V, Ti, Zn, Ga, In, Ru, Nb, Ta, Sn, Sr, La, Ce, Pr, and Zr.

1+x represents an atomic ratio of lithium to total transition metals, wherein x satisfies $0 \leq x \leq 0.1$, preferably $0.04 \leq x \leq 0.1$, and more preferably $0.05 \leq x \leq 0.1$, for example, $0.06 \leq x \leq 0.1$.

a represents an atomic ratio of nickel among the total transition metals in the lithium composite transition metal oxide, wherein a may satisfy $0.7 \leq a < 1$, preferably $0.8 \leq a \leq 0.99$, and more preferably $0.8 \leq a \leq 0.95$.

b represents an atomic ratio of cobalt among the total transition metals in the lithium composite transition metal oxide, wherein b may satisfy $0.01 \leq b < 0.3$, preferably $0.01 \leq b < 0.2$, and more preferably $0.01 \leq b \leq 0.15$.

c represents an atomic ratio of manganese among the total transition metals in the lithium composite transition metal oxide, wherein c may satisfy $0.01 \leq c < 0.3$, preferably $0.01 \leq c < 0.2$, and more preferably $0.01 \leq c \leq 0.15$.

d represents an atomic ratio of the $M^1$ element in the lithium composite transition metal oxide, wherein d may satisfy $0 \leq d < 0.3$, preferably $0 \leq d \leq 0.2$.

Also, in Formula 3, $a+b+c+d=1$.

The positive electrode active material prepared according to the method of the present invention has better capacity retention and resistance characteristics than a conventional nickel-rich positive electrode active material.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Example 1

After a transition metal precursor, $Ni_{0.88}Co_{0.05}Mn_{0.07}$ $(OH)_2$, and $LiOH \cdot H_2O$ were added such that a molar ratio of Li:transition metal was 1.07:1 and $Al(OH)_3$ was mixed, primary sintering was performed at 600° C. for 5 hours in an oxygen atmosphere to prepare a pre-sintered product and the pre-sintered product was ground using an air classifying mill (ACM).

A ratio of a spinel phase was measured by Rietveld refinement analysis of XRD data, which were measured by X-ray diffraction analysis (Bruker D4 Endeavor) on the pre-sintered product, using a HighScore software.

As a result of the measurement, the ratio of the spinel phase among crystalline phases of the pre-sintered product was found to be 13.5%.

Next, a lithium composite transition metal oxide, $LiNi_{0.86}Co_{0.05}Mn_{0.07}Al_{0.02}O_2$, was prepared by performing secondary sintering on the pre-sintered product at 765° C. for 5 hours in an oxygen atmosphere. After the lithium composite transition metal oxide was ground, washed, and dried, powder of the lithium composite transition metal oxide was mixed with 0.1 wt % of $H_3BO_3$ and heat-treated at 295° C. for 5 hours in an air atmosphere to prepare B-coated positive electrode active material powder.

Example 2

A pre-sintered product and positive electrode active material powder were prepared in the same manner as in Example 1 except that a primary sintering temperature during the preparation of the pre-sintered product was 650° C. A ratio of a spinel phase among crystalline phases of the pre-sintered product was found to be 9.0%.

Example 3

A pre-sintered product and positive electrode active material powder were prepared in the same manner as in Example 1 except that a molar ratio of Li:transition metal during the preparation of the pre-sintered product was 1.09:1. A ratio of a spinel phase among crystalline phases of the pre-sintered product was found to be 12.0%.

Comparative Example 1

A pre-sintered product and positive electrode active material powder were prepared in the same manner as in Example 1 except that a primary sintering temperature during the preparation of the pre-sintered product was 550° C. A ratio of a spinel phase among crystalline phases of the pre-sintered product was found to be 18.2%.

Comparative Example 2

A pre-sintered product and positive electrode active material powder were prepared in the same manner as in Example 1 except that a primary sintering temperature during the preparation of the pre-sintered product was 700° C. A ratio of a spinel phase among crystalline phases of the pre-sintered product was found to be 6.2%.

Comparative Example 3

A pre-sintered product and positive electrode active material powder were prepared in the same manner as in Example 1 except that a molar ratio of Li:transition metal during the preparation of the pre-sintered product was 1.03:1. A ratio of a spinel phase among crystalline phases of the pre-sintered product was found to be 16.2%.

Experimental Example

Each of the positive electrode active materials prepared in Examples 1 to 3 and Comparative Examples 1 to 3, a conductive agent (FX35), and a binder (mixture in which KF9700 and BM730H were mixed in a weight ratio of 1.35:0.15) were mixed in an N-methyl-2-pyrrolidone (NMP) solvent at a weight ratio of 97.5:1:1.5 to prepare a positive electrode slurry. One surface of an aluminum current collector was coated with the positive electrode slurry, dried at 130° C., and then rolled to have a porosity of 24% to prepare each positive electrode.

A lithium (Li) metal disk was used as a negative electrode.

After an electrode assembly was prepared by disposing a separator between the positive electrode and the negative electrode, a lithium secondary battery was prepared by disposing the electrode assembly in a battery case, and then injecting an electrolyte solution into the case. In this case, as the electrolyte solution, an electrolyte solution, in which 1 M $LiPF_6$ was dissolved in an organic solvent in which ethylene carbonate:ethyl methyl carbonate:diethyl carbonate were mixed in a volume ratio of 3:3:4, was used.

Each lithium secondary battery prepared as described above was charged at a constant current of 0.1 C to 4.25 V in a constant current/constant voltage (CC/CV) mode at 25° C. (cutoff current 0.05 C) and then was discharged to 3.0 V in a CC mode to measure initial discharge capacity. In this case, it was set that 1 C=200 mA/g.

Also, the charge and discharge cycle was repeated 30 times at a constant current of 0.33 C in a range of 3.0 V to 4.25 V at 45° C. to measure a capacity retention and a resistance increase rate with respect to resistance for 60 seconds after the start of discharge of each cycle. Measurement results are presented in Table 1 below.

TABLE 1

| | Ratio of spinel phase of pre-sintered product (%) | Initial discharge capacity (mAh/g) | Capacity retention (%) | Resistance increase rate (%) |
|---|---|---|---|---|
| Example 1 | 13.5 | 215.5 | 96.2 | 40.5 |
| Example 2 | 9.0 | 215.3 | 96.4 | 42.1 |
| Example 3 | 12.0 | 214.7 | 96.9 | 38.1 |
| Comparative Example 1 | 18.2 | 214.9 | 95.0 | 61.3 |
| Comparative Example 2 | 6.2 | 214.5 | 95.1 | 54.5 |
| Comparative Example 3 | 16.2 | 215.4 | 94.2 | 57.8 |

Referring to [Table 1], with respect to the secondary batteries in which the positive electrode active materials of Examples 1 to 3, which were prepared by performing the primary sintering such that the ratio of the spinel phase of the pre-sintered product was 7% to 16%, were used, it may be confirmed that, after 30 cycles, capacity retentions were higher and resistance increase rates were lower than those of the secondary batteries in which the positive electrode active materials of Comparative Examples 1 to 3, which were prepared so that the ratio of the spinel phase of the pre-sintered product was less than 7% or greater than 16%, were used.

The invention claimed is:

1. A method of preparing a positive electrode active material, the method comprising:

forming a pre-sintered product by mixing a transition metal precursor having a nickel content of 70 atm % or more and a lithium raw material and performing primary sintering; and forming a lithium composite transition metal oxide by performing secondary sintering on the pre-sintered product, wherein the primary sintering is performed such that a ratio of a spinel phase of the pre-sintered product is in a range of 7% to 16%, wherein the transition metal precursor and the lithium raw material are mixed in amounts such that a molar ratio of lithium:transition metal is in a range of 1.04:1 to 1.1:1, wherein the primary sintering is performed at a primary sintering temperature ranging from 580° C. to 680° C., wherein the secondary sintering is performed at a temperature that is 100° C. to 200° C. higher than the primary sintering temperature, and wherein the secondary sintering is performed in an oxygen atmosphere.

2. The method of claim 1, further comprising measuring crystalline phase information of the pre-sintered product after the forming of the pre-sintered product.

3. The method of claim 1, further comprising grinding or classifying the pre-sintered product after the forming of the pre-sintered product.

4. The method of claim 1, wherein the transition metal precursor is a compound represented by Formula 1 or Formula 2:

$$Ni_aCo_bMn_c(OH)_2 \qquad \text{[Formula 1]}$$

$$Ni_aCo_bMn_cOOH \qquad \text{[Formula 2]}$$

wherein, in Formula 1 and Formula 2, $0.7 \leq a < 1$, $0.01 \leq b < 0.3$, and $0.01 \leq c < 0.3$.

5. The method of claim 1, wherein the lithium raw material is $LiOH \cdot H_2O$.

6. The method of claim 1, wherein the secondary sintering is performed in a temperature range of 700° C. to 850° C.

7. The method of claim 1, wherein a $M^1$ raw material is further mixed with the transition metal precursor having the nickel content of 70 atm % or more and the lithium raw material, wherein $M^1$ is at least one element selected from the group consisting of Al, Si, B, W, Mo, Mg, V, Ti, Zn, Ga, In, Ru, Nb, Ta, Sn, Sr, La, Ce, Pr, and Zr.

8. The method of claim 7, wherein the $M^1$ raw material is aluminum hydroxide.

9. The method of claim 1, wherein the lithium composite transition metal oxide is a compound represented by Formula 3:

$$Li_{1+x}[Ni_aCo_bMn_cM^1_d]O_2 \qquad \text{[Formula 3]}$$

wherein, in Formula 3, $0 \leq x \leq 0.1$, $0.7 \leq a < 1$, $0.01 < b < 0.3$, $0.01 \leq c < 0.3$, $0 \leq d < 0.3$, and $a+b+c+d=1$, and $M^1$ is at least one element selected from the group consisting of Al, Si, B, W, Mo, Mg, V, Ti, Zn, Ga, In, Ru, Nb, Ta, Sn, Sr, La, Ce, Pr, and Zr.

* * * * *